United States Patent
Ramaley

(10) Patent No.: US 12,470,759 B2
(45) Date of Patent: Nov. 11, 2025

(54) METHODS AND SYSTEMS FOR REDIRECTING CONTENT PLAYERS

(71) Applicant: COMCAST CABLE COMMUNICATIONS MANAGEMENT, LLC, Philadelphia, PA (US)

(72) Inventor: Alan Ramaley, Seattle, WA (US)

(73) Assignee: Comcast Cable Communications Management, LLC, Philadelphia, PA (US)

(*) Notice: Subject to any disclaimer, the term of this patent is extended or adjusted under 35 U.S.C. 154(b) by 0 days.

(21) Appl. No.: 15/812,867

(22) Filed: Nov. 14, 2017

(65) Prior Publication Data

US 2019/0149856 A1   May 16, 2019

(51) Int. Cl.
*H04N 21/239* (2011.01)
*G06Q 30/0241* (2023.01)
*H04L 65/75* (2022.01)
*H04N 21/262* (2011.01)
*H04N 21/61* (2011.01)
*H04N 21/658* (2011.01)
(Continued)

(52) U.S. Cl.
CPC ..... *H04N 21/2393* (2013.01); *G06Q 30/0277* (2013.01); *H04L 65/765* (2022.05); *H04N 21/26258* (2013.01); *H04N 21/6175* (2013.01); *H04N 21/658* (2013.01); *H04N 21/812* (2013.01); *H04N 21/8455* (2013.01); *H04N 21/8456* (2013.01); *H04N 21/8586* (2013.01)

(58) Field of Classification Search
CPC ............ H04N 21/2393; H04N 21/812; H04N 21/8455; H04N 21/8586
See application file for complete search history.

(56) References Cited

U.S. PATENT DOCUMENTS

| | | | | |
|---|---|---|---|---|
| 7,296,076 B1 * | 11/2007 | Portolani | ............... | H04L 67/02 709/227 |
| 8,606,090 B2 * | 12/2013 | Eyer | ..................... | H04N 5/783 386/343 |

(Continued)

FOREIGN PATENT DOCUMENTS

WO   WO-2015/188100 A1   12/2015

OTHER PUBLICATIONS

CA, 3023923, Nov. 13, 2018, Comcast Cable Communication Management, LLC.

(Continued)

*Primary Examiner* — Pinkal R Chokshi
(74) *Attorney, Agent, or Firm* — Ballard Spahr LLP

(57) ABSTRACT

Methods and systems for redirecting content players are described. A request for content may be received by a network device from a user device. A session ID may be generated to track both the current and subsequent request for the content. The network device may redirect the user device to an initial segment of an advertisement. For an initial request by the content player that requests a segment of the content not associated with an initial segment of the advertisement, the content player can be redirected to the initial segment of the advertisement. For subsequent request for the content, the content player can be provided the particular segment of the content initially requested without redirection.

20 Claims, 11 Drawing Sheets

(51) Int. Cl.
*H04N 21/81* (2011.01)
*H04N 21/845* (2011.01)
*H04N 21/858* (2011.01)

(56) References Cited

U.S. PATENT DOCUMENTS

| | | | |
|---|---|---|---|
| 11,917,219 B2* | 2/2024 | Link | H04N 21/47217 |
| 2008/0040741 A1* | 2/2008 | Matsumoto | H04N 21/26258 |
| | | | 725/32 |
| 2008/0144655 A1* | 6/2008 | Beam | H04L 67/02 |
| | | | 370/466 |
| 2009/0007172 A1* | 1/2009 | Ahanger | H04L 67/20 |
| | | | 725/36 |
| 2009/0297122 A1* | 12/2009 | Barton | G06F 16/7867 |
| | | | 386/250 |
| 2011/0093885 A1* | 4/2011 | Ravula | H04N 21/26258 |
| | | | 725/32 |
| 2014/0189139 A1* | 7/2014 | Cheng | H04L 65/60 |
| | | | 709/231 |
| 2015/0358689 A1* | 12/2015 | Wen | H04N 21/4331 |
| | | | 725/32 |
| 2016/0127440 A1* | 5/2016 | Gordon | H04N 21/23439 |
| | | | 709/219 |
| 2017/0272485 A1 | 9/2017 | Gordon et al. | |
| 2017/0308681 A1* | 10/2017 | Gould | G06Q 30/0248 |
| 2017/0332113 A1* | 11/2017 | Haritaoglu | H04L 67/1097 |
| 2017/0353516 A1* | 12/2017 | Gordon | H04L 67/02 |
| 2018/0124440 A1* | 5/2018 | McLean | H04N 21/47217 |
| 2021/0126980 A1* | 4/2021 | Yan | H04L 67/145 |

OTHER PUBLICATIONS

EP, 18205979.0 (3484162), Nov. 13, 2018, (May 15, 2019), Comcast Cable Communication Management, LLC.

3rd Generation Partnership Project, Technical Specification Group Services and System Aspects, Packet-switched Streaming Service (PSS), Improved Support for Dynamic Adaptive Streaming over HTTP in 3GPP (Release 14),3GPP Standard , Technical Report, 3GPP TR 26.938, 3rd Generation Partnership Project (3GPP), Mobile Competence Centre, 650, Route Des Lucioles, F-06921 Sophia-Antipolis Cedex, France, vol. SA WG4, No. V14.0.0, Mar. 18, 2017 (Mar. 18, 2017), pp. 1-98.

Technologies under Consideration for DASH, 120. MPEG Meeting, Oct. 23, 2017-Oct. 27, 2017; Macau, (Motion Picture Expert Group or ISO/IEC JTC1/SC29/WG11), No. N17213, Nov. 2, 2017 (Nov. 2, 2017).

European Search Report was mailed on Mar. 19, 2019 by the European Patent Office for EP Application No. 18205979.0, filed on Nov. 13, 2018 and published as EP 3484162 on May 15, 2019 (Applicant—Comcast Corp.) (9 Pages).

* cited by examiner

METHODS AND SYSTEMS FOR REDIRECTING CONTENT PLAYERS

BACKGROUND

Streaming content (e.g., video) is often associated with one or more advertisements. During a content stream (e.g., live event) there may be an advertisement that precedes the content. In the situation where different devices request streaming content, each device may be directed to a different point in the content stream. For example, one or more devices may be directed to a particular segment of a video, while other devices may be directed to a different segment of the video. Some advertisements may start before, after, or during the segment to which a device was directed. However, in order for an advertisement to count as an impression for advertisement tracking purposes, the advertisement must start at the beginning of the segment to which a device was directed. These and other shortcomings are addressed by the present disclosure.

SUMMARY

It is to be understood that both the following general description and the following detailed description provide examples and are explanatory only and are not restrictive. Methods and systems are disclosed for redirecting a content player to an initial segment of an advertisement in a content stream in the event the content player requests to receive the content stream at a point corresponding to a segment other than the initial segment of the advertisement.

A network device may receive one or more requests for content from one or more content players. The one or more content players may be from disparate manufacturers/sources. For example, the one or more content players may comprise one or more of Roku, Google Chromecast, Android TV (e.g., Nvidia Shield, Xiaomi Mi Box, etc.), Apple TV, Amazon Fire, any number of set top boxes, and the like. The requested content may comprise one or more segments. The one or more segments may correspond to one or more advertisement segments and to one or more content item segments (e.g., sporting event, movie, etc. . . . ). A request for content may include a specific point/segment in the content at which the content is requested.

Initial request for content (e.g., the first time content is requested by a particular content player) can cause a session identifier (ID) to be generated. The session ID can enable a content player to track unique content delivery sessions and the request for content can be redirected to an initial segment of an advertisement, regardless of the segment corresponding to the actual request by the content player (which will be different across content players). Subsequently, when content is requested, it can be provided to the content player at the point in the content actually requested by the content player. As far as the content player is concerned, because the redirects may be performed on a server side, it is receiving the content/content segments it requested.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, provide examples and together with the description, serve to explain the principles of the methods and systems.

DETAILED DESCRIPTION

Figure 1:
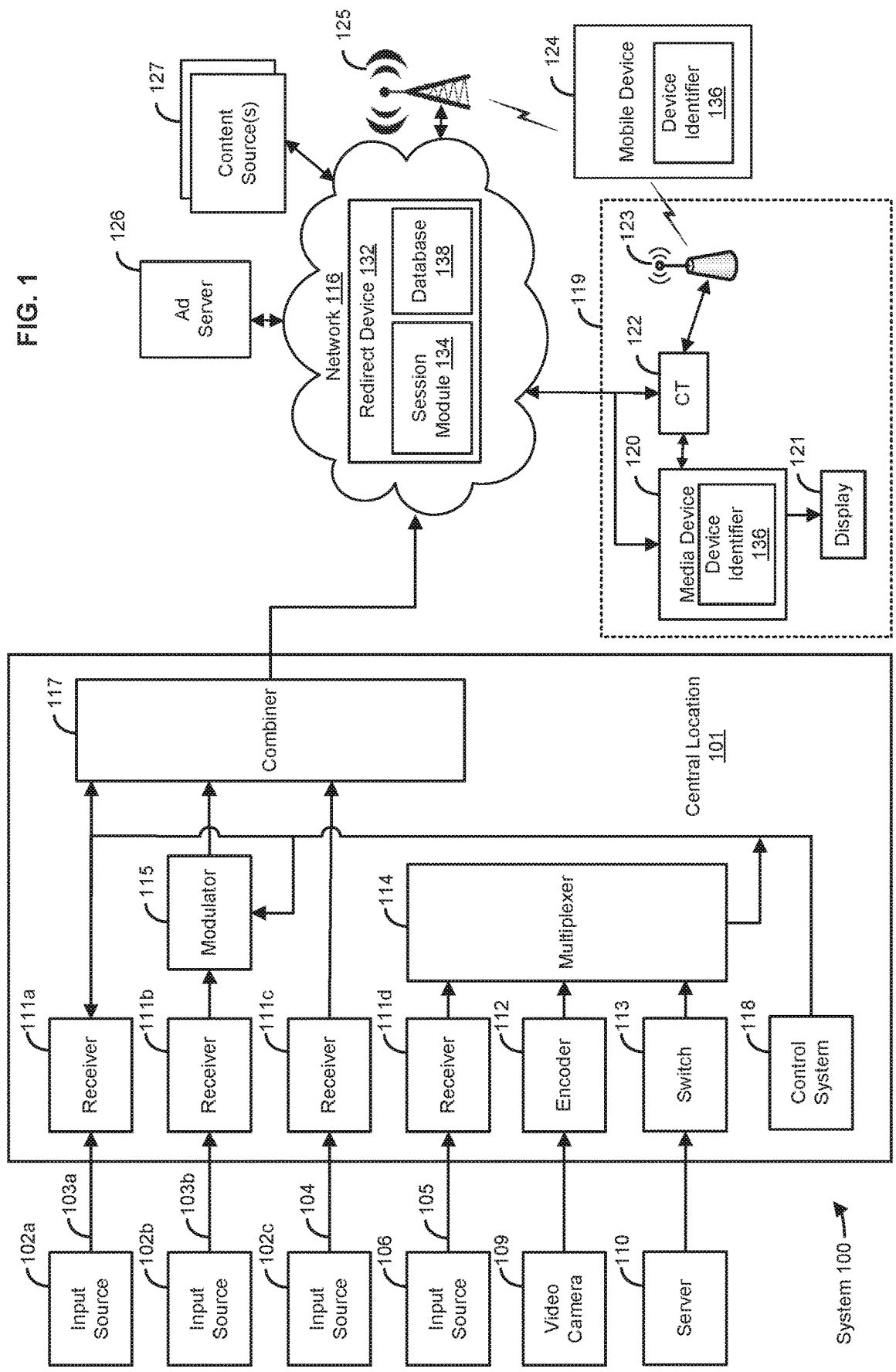
FIG. 1 is an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

The methods and systems are described below with reference to block diagrams and flowcharts of methods, systems, apparatuses and computer program products. It will be understood that each block of the block diagrams and flowcharts, and combinations of blocks in the block diagrams and flowcharts, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items may comprise any information or data that may be licensed to one or more individuals (or other entities, such as business or group). In various embodiments, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various embodiments, the content items described herein may include electronic representations of music, spoken words, or other audio, which may include but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP), Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some embodiments, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In another example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

Content players (e.g., video players and/or audio players such as Roku, Google Chromecast, Android TV (e.g., Nvidia Shield, Xiaomi Mi Box, etc.), Apple TV, Amazon Fire, any number of set top boxes, and the like) can be redirected to an initial segment of an advertisement in the event the content players request to receive content at a point other than the initial segment of the advertisement. The content players may transmit requests for content (e.g., live video, pre-recorded video, etc.) to a content server. The requests for the content may be for particular segments of the content. The particular segments requested may vary from content player to content player. The particular segments of the content requested may not include an initial segment of an advertisement. The content server may redirect the content players to the initial segment of the advertisement despite the content players not having requested the initial segment of the advertisement. Based on the redirection of the request for the content, the content players will receive the initial segment of the advertisement (e.g., a pre-roll ad) associated with the content regardless of which segment of the content was actually requested. Once the advertisement associated with the content is completed, subsequent requests for content from the content players may result in the content being provided to the content player as requested (e.g., not redirected). For example, a session ID may be generated upon a first request from a content player. The session ID may be used to determine if a subsequent request from the content player is received.

FIG. 1 shows an example system for redirecting content players/devices. Those skilled in the art will appreciate that present methods and systems can employ both digital and analog equipment. One skilled in the art will appreciate that provided herein is a functional description and that the respective functions may be performed by software, hardware, or a combination of software and hardware.

A system 100 may comprise a central location 101 (e.g., a headend), which may receive content (e.g., data, input programming, and the like) from multiple sources. The central location 101 may combine the content from the various sources and may distribute the content to user (e.g., subscriber) locations (e.g., user location 119) via a network 116 (e.g., content distribution and/or access system).

The central location 101 may receive content from a variety of sources 102a, 102b, 102c. The content may be transmitted from the source to the central location 101 via a variety of transmission paths, including wireless (e.g., satellite paths 103a, 103b) and a terrestrial path 104. The central location 101 may also receive content from a direct feed source 106 via a direct line 105. Other input sources may comprise capture devices such as a video camera 109 or a server 110. The content provided by the content sources may comprise a single content item, a portion of a content item (e.g., content fragment), a content stream, a multiplex that includes several content items, and/or the like.

The central location 101 may comprise one or a plurality of receivers 111a, 111b, 111c, 111d that are each associated with an input source. For example, MPEG encoders, such as an encoder 112, are included for encoding local content or a video camera 109 feed. A switch 113 may provide access to the server 110, which may be a Pay-Per-View server, a data server, an internet router, a network system, a phone system, and the like. Some signals may require additional processing, such as signal multiplexing, prior to being modulated. Such multiplexing may be performed by a multiplexer (mux) 114.

The central location 101 may comprise one or a plurality of modulators 115 for interfacing to a network 116. The modulators 115 may convert the received content into a modulated output signal suitable for transmission over a network 116. The output signals from the modulators 115 may be combined, using equipment such as a combiner 117, for input into the network 116.

The network 116 may comprise a content delivery network, a content access network, and/or the like. For example, the network 116 may be configured to provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of the system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The network 116 may comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users may be connected to the network 116 at one or more of the user locations. At the user location 119, a media device 120 may demodulate and/or decode, if needed, the signals for display on a display device 121, such as on a television set (TV) or a computer monitor. For example, the media device 120 may comprise a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may comprise a set-top box, a digital streaming device, a gaming device, a media storage device, a digital recording device, a combination thereof, and/or the like. For example, the media device 120 may be a content player (e.g., video player and/or audio player such as Roku, Google Chromecast, Android TV (e.g., Nvidia Shield, Xiaomi Mi Box, etc.), Apple TV, Amazon Fire, any number of set-top boxes, and the like). The media device 120 may comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or satellite dish.

The communication terminal 122 may be located at the user location 119. The communication terminal 122 may be configured to communicate with the network 116. The communication terminal 122 may comprise a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. For example, for a cable network, the communication terminal 122 may be configured to provide network access via a variety of communication protocols and standards, such as Data Over Cable Service Interface Specification.

The user location 119 may comprise a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). For example, the first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

Content players (devices) at and/or associated the user location 119 (e.g., the mobile device 124, the media device 120, or other computing devices (e.g., laptops), etc.) may be associated with a device identifier 136. As an example, the device identifier 136 may be any identifier, token, character, string, or the like, for differentiating one content player from another content player. For example, the device identifier 136 may be an identifier, token, character, string, or the like, for differentiating a Roku from an Android TV. Additionally, the device identifier 136 may identify a content player as belonging to a particular class of devices. As a further example, the device identifier 136 may comprise information relating to the content player such as a manufacturer, a model or type of device, a service provider associated with the content player, a state of the content player, a locator, and/or a label or classifier. Other information may be represented by the device identifier 136. The device identifier 136 may comprise or provide an internet protocol address, a network address, a media access control (MAC) address, an Internet address, or the like. As an example, the device identifier 136 may be relied upon to track sessions between the content player and the redirect device 132 and/or other devices (e.g., ad server 126, content sources 127, etc.). As a further example, the device identifier 136 may be used as an identifier or locator of the content player.

Additionally, the user location 119 may not be fixed. By way of example, a user may receive content from the network 116 on the mobile device 124. The mobile device 124 may comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). For example, the mobile device 124 may communicate with a second access point 125. The second access point 125 may be a cell tower, a wireless hotspot, another mobile device, and/or other remote access point. The second access point 125 may be within range of the user location 119 or remote from the user location 119. For example, the second access point 125 may be located along a travel route, within a business or residence, or other useful locations (e.g., travel stop, city center, park, etc.).

The system 100 may comprise one or more content source(s) 127 (e.g., in addition to sources 102*a*, 102*b*, 102*c*, and 106). The content source(s) 127 may be configured to provide content (e.g., video, audio, games, applications, data) to the user. The content may be formatted such that the content comprises one or more segments (e.g., points). The content may be related to and/or associated with an advertisement. For example, one or more segments (e.g., points) of the content may correspond to one or more segments of an advertisement (e.g., advertisement segments). As such, the content source(s) 127 may be configured to provide streaming media, such as on-demand content (e.g., video on-demand), live events, content recordings, and/or the like that is associated with one or more advertisements (e.g., pre-roll ads).

The content source(s) 127 may be managed by third party content providers, service providers (e.g. advertisement service providers, advertisement affiliates, etc.), online content providers, over-the-top content providers, and/or the like. The content may be provided via a subscription, by individual item purchase or rental, and/or the like. The content source(s) 127 may be configured to provide the content via a packet switched network path, such as via an internet protocol (IP) based connection.

The content may be accessed by users via applications, such as mobile applications, television applications, set-top box applications, gaming device applications, and/or the like. An example application may be a custom application (e.g., by content provider, for a specific device), a general content browser (e.g., web browser), an electronic program guide, and/or the like.

A device (e.g., a user device, a content player, a networking device, a computing device, a redirect device 132, a server, etc.) may submit requests for content provided by the content source(s) 127. The request for content may comprise a hypertext markup language (HTML) technique such as HTTP GET, for example. The request for content may comprise a request for a playlist, a multimedia file, a text file, code, a script, metadata, resource location(s), combinations thereof, and the like. The content source(s) 127 may provide content (e.g., video, streaming video, etc.) as, or in a form comprising, a playlist, a multimedia file, a text file, code, a script, metadata, resource location(s), combinations thereof, and the like. Additionally, the request may comprise a request for a specific segment of content.

The system 100 may comprise an ad server 126. The ad server 126 may be a computing device, network device, server, and/or the like. The ad server 126 may be configured to provide advertisements (e.g., pre-roll ads, pre-roll videos, etc.), manage requests for advertisements, and/or track advertisement impressions. The ad server 126 may provide advertisements related to and/or associated with content provided by the content source(s) 127. The ad server 126 may provide advertisements associated with content provided by the content source(s) 127 based on requests for the content. For example, based on a request for specific segments of the content, the ad server 126 may provide an advertisement (e.g., a pre-roll advertisement) associated with content provided by the content source(s) 127.

A device (e.g., content source(s) 127, redirect device 132) may submit requests for advertisements to the ad server 126. A request(s) for an advertisement may comprise information associated with the advertisement such as duration information, description information, format information (e.g., segments of the advertisement, video fragments of the advertisement, etc.), combinations thereof, and the like. A request for an advertisement(s) may comprise a request for a playlist, a multimedia file, a text file, code, a script, metadata, resource location(s), combinations thereof, and the like. The ad server 126 may provide advertisements (e.g., pre-roll ads, pre-roll video, etc.) as, or in a form comprising, a playlist, a multimedia file, a text file, code, a script, metadata, resource location(s), combinations thereof, and the like.

The system 100 may comprise a redirect device 132. The redirect device 132 may be a computing device, network device, server, and/or and other similar device. The redirect device 132 may take the form of a hardware device or a software application running on another device of the system 100, such as the ad server 126 and/or the content source 127. The redirect device 132 may be configured to support a content player(s), such as a user device, media device 120, and mobile device 124, for example. The redirect device 132 may be configured to deliver content to the content player(s). The redirect device 132 may package content for delivery to the content player(s). The packaged content may comprise content provided by the content source(s) 127 and advertisements provided by the ad server 126. The redirect device 132 may be configured to deliver playlists comprising resource locations for content associated with advertisements (e.g., packaged content) to the content player based on a request for the content. The redirect device 132 may support one or more content players. For example, the one or more content players may comprise one or more of Roku, Google Chromecast, Android TV (e.g., Nvidia Shield, Xiaomi Mi Box, etc.), Apple TV, Amazon Fire, any number of set top boxes, and the like. The redirect device may deliver playlists for content associated with advertisements (e.g., packaged content) to the one or more content players.

The redirect device 132 may be configured to manage information about one or more advertisements. For example, the redirect device 132 may be configured to manage how, when, and where the advertisements are to be (or were) rendered (e.g., advertisement selections, advertisement impression time, advertisement impression date, advertisement segment size, advertisement volume levels, etc.) and associate the information about one or more advertisements with a request for the content. The redirect device 132 may associate content provided by the content source(s) 127 with advertisements provided by ad server 126 based on the request for content and/or a session identifier (ID).

The association between the content and the advertisement may comprise related playlists, multimedia files, text files, code, script, metadata, resource locations, combinations thereof, and the like. For example, metadata containing a genre of content requested may be compared to metadata containing a genre of an advertisement. If the genres are the same, the advertisement may be associated with the content.

The redirect device 132 may comprise a session module 134. The session module 134 may generate, send, and/or receive session information, such as a session identifier (ID). The session ID may be used for tracking unique sessions (e.g., initial sessions, repeat sessions, subsequent sessions, etc.) based on the request for the content. A session ID may be generated. For example, a session ID may be generated in response to a request for a particular content segment.

Session IDs may be in various forms. For example, session IDs may be in a form of hashes generated by one or more hash functions. Based on requests for content, the session module 134 may generate one or more hash keys. The session module 134 may generate one or more hash tables by assigning the session IDs to the one or more hash keys. The one or more hash tables may be stored in database 138. Additionally, the session module 134 may generate, store, and access session IDs by any other suitable means, form, and/or logic.

The redirect device 132 may receive one or more requests for content from different content players that vary in the specific point in the content requested. For example, one content player (e.g., a Roku) may submit an initial request for an initial segment of the content beginning at 0-second duration, and another content player (e.g., an Android TV) may submit a second request for a segment of the content beginning at a 10-second duration. A session ID would be generated for the Roku since this is the first request by the Roku, whereas a session ID would have already been generated for the Android TV since this is the second request by the Android TV. The session ID(s) may be a unique identifier(s) assigned to a specific content player(s) based on the request for content and/or a duration/incident of consumption of the content. The session ID may be generated and stored (e.g., stored in a database stored in database 138, etc.) as a cookie, form field, Uniform Resource Locator, combinations thereof, and the like.

The session module 134 may be used to determine whether a session ID is associated with a content player (e.g., mobile device 124, media device 120, display device 121, computing device, network device, etc.) making the request. For example, if a session ID is not associated with the request for content and/or the content player, it may be determined that the request for the content is an initial request for the content. Based on the request for the content being the initial request, the session module 134 may generate a session ID. The session ID may be associated with the request. For example, the request may comprise the session ID. Additionally, the session ID may be associated with the content player making the request. For example, the session ID may be associated with a device identifier (e.g., device identifier 136) associated the content player making the request. The session ID may be tracked to identify subsequent requests for the content. As such, the session ID may be tracked, recorded, stored (e.g., stored in a database, stored in database 138, etc.), combinations thereof, and the like. Alternatively, if a session ID is already associated (e.g., stored in a database, stored in database 138, comprised in the request, etc.) with the request for the content and/or the content player, the redirect device 132 may determine that the request for the content is not the initial request for the content.

The redirect device 132 may direct the request to an initial segment of an advertisement based on the request for content being an initial request for the content. The request for the content may comprise a request for a particular segment and/or an entire content item. Based on the request being identified as an initial request for the content, the redirect device 132 may be configured to ignore the request for the particular segment and redirect the content player making the request to an initial segment of an advertisement.

It may be determined that a request for content is not the initial request for the content if a session ID has been previously generated, a session ID has been associated with the content player and/or the request, and/or a session ID has been stored by the redirect device 132 (or any other device in the system 100). Based on the request for content not being the initial request, the redirect device 132 may direct the content player to the requested segments of the content provided by the content source(s) 127, without redirection.

The request for content may comprise the session ID and/or a device (e.g., content player) identifier (e.g., Media Access Control address, etc.) for tracking subsequent requests. For example, the redirect device 132 may provide and/or direct the content player to the content requested by providing one or more resource locations corresponding to segments of the content requested. The redirect device 132 may provide information associated with the content such as which audio, video, and/or other media files correspond to each segment of the content (e.g., which audio, video, and/or other media should be retrieved from the content source(s) 127). The content may be provided to and/or otherwise made available to the content player as, or in a form comprising, playlists, multimedia files, text files, code, script, metadata, resource locations, combinations thereof, and the like.

Figure 2A:
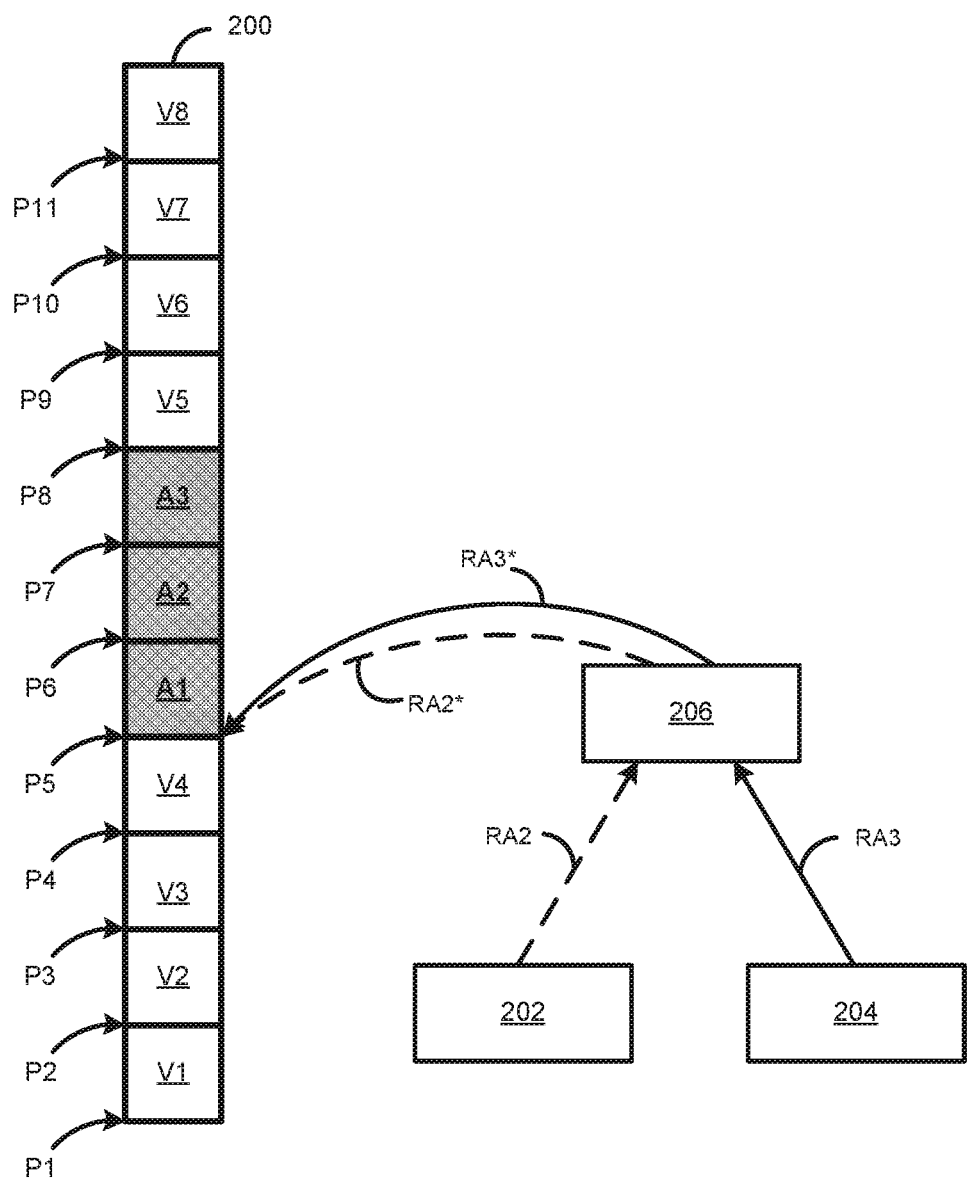
FIG. 2A is a diagram of redirecting a content player to an initial segment of an advertisement within a content stream.
Figure 2B:
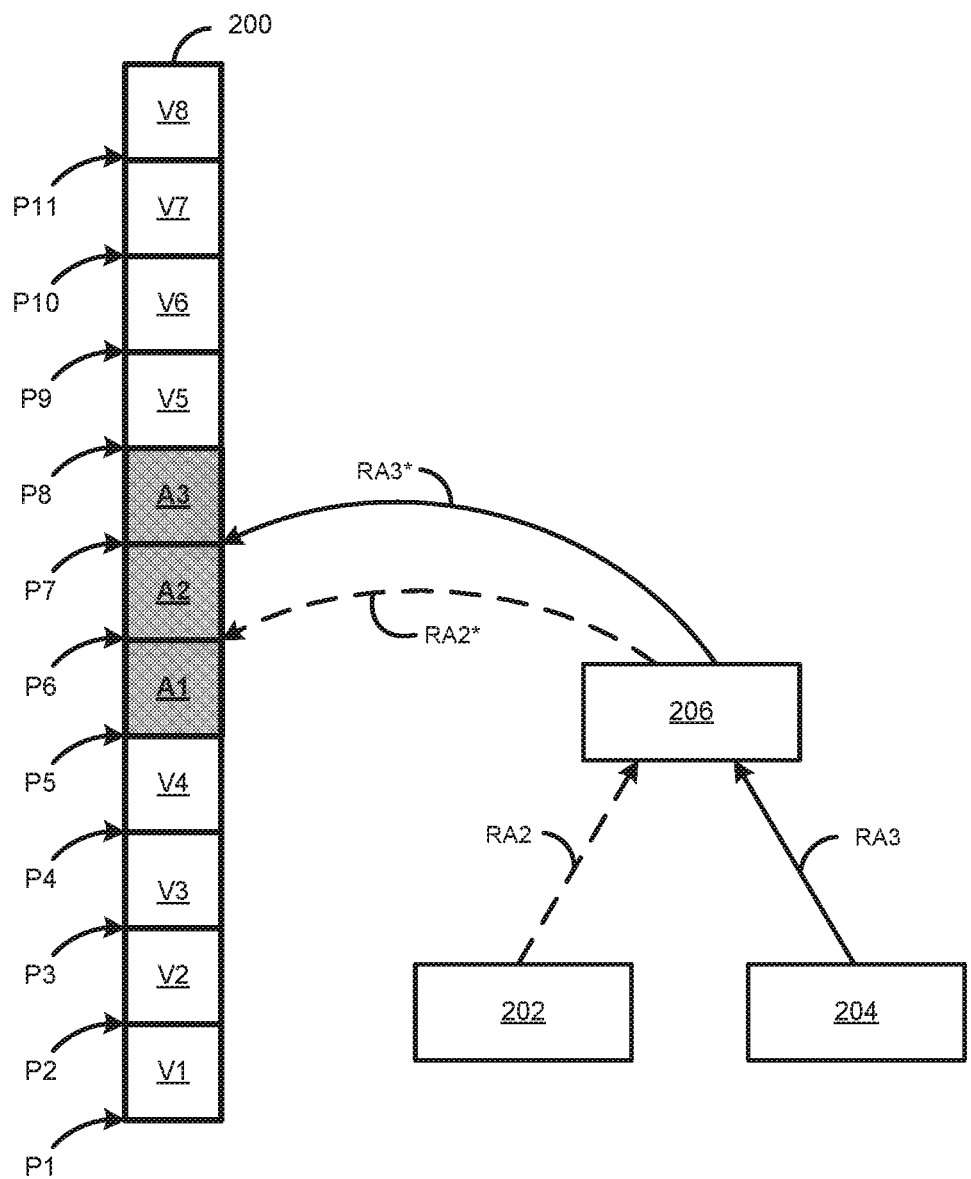
FIG. 2B is a diagram of directing a content player to a point in a content stream based on a subsequent request for the content stream.

FIG. 2A and FIG. 2B are block representations of a process for redirecting/directing content players to a segment(s) of an advertisement in a content stream. Turning first to FIG. 2A, the block diagram represents a process for redirecting content players to an initial segment of an advertisement in a content stream. The content stream 200 (e.g., video stream) may be provided by a content source (e.g., content source(s) 127). The content stream 200 may be provided by a content source (e.g., content source(s) 127) and/or otherwise made available to a content player 202 (e.g., media device 120, mobile device 124) and/or a content player 204 (e.g., media device 120, mobile device 124) as, or in a form comprising, a playlist, a multimedia file, a text file, a code, a script, metadata, a resource location(s), combinations thereof, and the like. Providing and/or making available the content stream 200 may comprise associating the content stream 200 with resource locations. The content player 202 and the content player 204 may each be a different type, brand, etc. of content players. For example, Roku, Google Chromecast, Android TV (e.g., Nvidia Shield, Xiaomi Mi Box, etc.), Apple TV, Amazon Fire, any number of set top boxes, and the like.

A content stream (e.g., the content stream 200, video stream, etc.) may comprise segments. The segments may be fragments of the content stream. The segments may be collections of information. The segment may correspond to a single file that is listed in a playlist containing resource locations (e.g., URLs) of different files that comprise the content stream (e.g., the video stream). Combined together, the segments may make up the content stream. For example, segments of video may make up a whole video.

The content stream 200 may comprise segments (V1, V2, V3, V4, A1, A2, A3, V5, V6, V7, V8). Some or all of the segments may comprise advertisements (e.g., A1, A2, A3 may be segments of video of an advertisement). Some or all of the segments may comprise video segments (e.g., V1, V2, V3, V4, V5, V6, V7, V8 may be segments of video of a football game or show, etc.). One or more segments may precede the segments V1, V2, V3, V4, A1, A2, A3, V5, V6, V7, V8 and one or more segments may follow the segments V1, V2, V3, V4, A1, A2, A3, V5, V6, V7, V8. The segments (V1, V2, V3, V4, A1, A2, A3, V5, V6, V7, V8) may be associated with different points (P1, P2, P3, P4, P5, P6, P7, P8, P9, P10, P11) of the content stream 200.

Points (P1, P2, P3, P4, P5, P6, P7, P8, P9, P10, P11) may be associated with a runtime/duration of the content stream 200. For example, the point P1 may correspond with the video segment V1 at the start of the content stream 200, the point P2 may correspond with the video segment V2 at a 1-second runtime/duration of the content stream 200, the point P3 may correspond with the video segment V3 at a 2-second run-time/duration of the content stream 200, the point P4 may correspond with the video segment V4 at a 3-second runtime/duration of the content stream 200, the point P5 may correspond with the advertisement segment A1 at a 4-second runtime/duration of the content stream 200, the point P6 may correspond with the advertisement segment A2 at a 5-second runtime/duration of the content stream 200, the point P7 may correspond with the advertisement segment A3 at a 6-second runtime/duration of the content stream 200, the point P8 may correspond with the video segment V5 at a 7-second runtime/duration of the content stream 200, the point P9 may correspond with the video segment V6 at a 8-second runtime/duration of the content stream 200, the point P10 may correspond with the video segment V7 at a 9-second run-time/duration of the content stream 200, and the point P11 may correspond with the video segment V8 at a 10-second runtime/duration of the content stream 200. The segments (V1, V2, V3, V4, A1, A2, A3, V5, V6, V7, V8) and/or the different points (P1, P2, P3, P4, P5, P6, P7, P5, P9, P10, P11) may be associated with resource locations.

A redirect device 206 (e.g., the redirect device 132) may receive requests (e.g., RA2, RA3) for the content stream 200 from the content player 202 and the content player 204. The requests (e.g., RA2, RA3) for the content stream 200 may comprise requests to initiate (e.g., begin playback, start streaming, request, etc. . . . ) receipt of the content stream 200 starting at the point P6 (RA2) and at the point P7 (RA3). The content player 202 may send the request RA2 to the redirect device 206 requesting the content stream 200 at the point P6 which corresponds to the advertisement segment A2. The content player 204 may send the request RA3 to the redirect device 206 requesting the content stream 200 at the point P7 which corresponds to the advertisement segment A3.

The redirect device 206 may determine that the request RA2 and the request RA3 are initial requests for the content stream 200. The redirect device 206 may determine that the request RA2 is the initial request for the content stream 200 because a session ID is not associated with the request RA2, or the content player 202. The redirect device 206 may determine that the request RA3 is the initial request for the content stream 200 because a session ID is not be associated with the request RA3, or the content player 204.

The redirect device 206, based on the determination that the request RA2 is the initial request for the content stream 200, may redirect the request RA2 as a request RA2* to the point P5 which corresponds to an initial segment A1 of the advertisement despite the fact that the content player 202 requested point P6 in the content stream 200. The redirect device 206, based on the determination that the request RA3 is the initial request for the content stream 200, may redirect the request RA3 as a request RA3* to the point P5 which corresponds to the initial segment A1 of the advertisement despite the fact that the content player 204 requested point P7 in the content stream 200.

Turning to FIG. 2B, the block diagram represents a process for directing content players to a requested segment of an advertisement comprised in a content stream. The redirect device 206 may receive the requests (e.g., RA2, RA3) for the content stream 200 from the content player 202 and the content player 204. The requests (e.g., RA2, RA3) for the content stream 200 may comprise requests associated with specific points (e.g., P5, P6, P7, etc.) in the content stream 200. The content player 202 may send the request RA2 to the redirect device 206 requesting the content stream 200 at the point P6. The content player 204 may send the request RA3 to the redirect device 206 requesting the content stream 200 at the point P7.

The requests RA2 and RA3 may comprise session IDs. The requests RA2 and RA3 may be sent as HTTP queries (e.g., HTTP GET) that comprise session IDs as parameters. Session IDs may be associated with the content players. A session ID may be associated with content player 202 based on a device identifier (e.g., device identifier 136) associated with the content player 202. A session ID may be associated with content player 204 based on a device identifier (e.g., device identifier 136) associated with the content player 204.

The redirect device 206 may determine that the request RA2 and the request RA3 are not initial requests for the content stream 200. The redirect device 206 may determine that the request RA2 is not the initial request for the content stream 200 because a session ID is associated with the request RA2, or the content player 202. The redirect device 206 may determine that the request RA3 is not an initial request for the content stream 200 because a session ID is associated with the request RA3, or the content player 204.

The redirect device 206 may determine that session IDs are associated with the requests RA2 and RA3 in different ways. For example, the redirect device 206 may determine that session IDs are associated with the requests RA2 and RA3 by determining that the requests RA2 and RA3 comprise session IDs. Further, the redirect device 206 may determine a session ID is associated with the request RA2 and/or the content player 202 by determining that a session ID associated with a device identifier (e.g., device identifier 136) associated with the content player 202 is stored in a storage (e.g., database 138, mass storage device 904 (FIG. 9)). The redirect device 206 may determine a session ID is associated with the request RA3 and/or the content player 204 by determining that a session ID associated with a device identifier (e.g., device identifier 136) associated with the content player 204 is stored in a storage (e.g., database 138, mass storage device 904 (FIG. 9)). For example, the redirect device 206 may access a lookup table comprising session ID information to determine that session IDs are associated with the requests (RA2 and RA3) and/or the content players (content player 202 and content player 204). Additionally, the redirect device 206 may determine that session IDs are associated with the requests RA2 and RA3 by any other suitable means, form, and/or logic.

The redirect device 206, based on the determination that the request RA2 is not the initial request for the content stream 200, may direct the request RA2 as a request RA2* to the point P6 as requested by the content player 202. The redirect device 206, based on the determination that the request RA3 is not the initial request for the content stream 200, may direct the request RA3 as a request RA3* to the point P7 as requested by the content player 202.

Figure 3A:
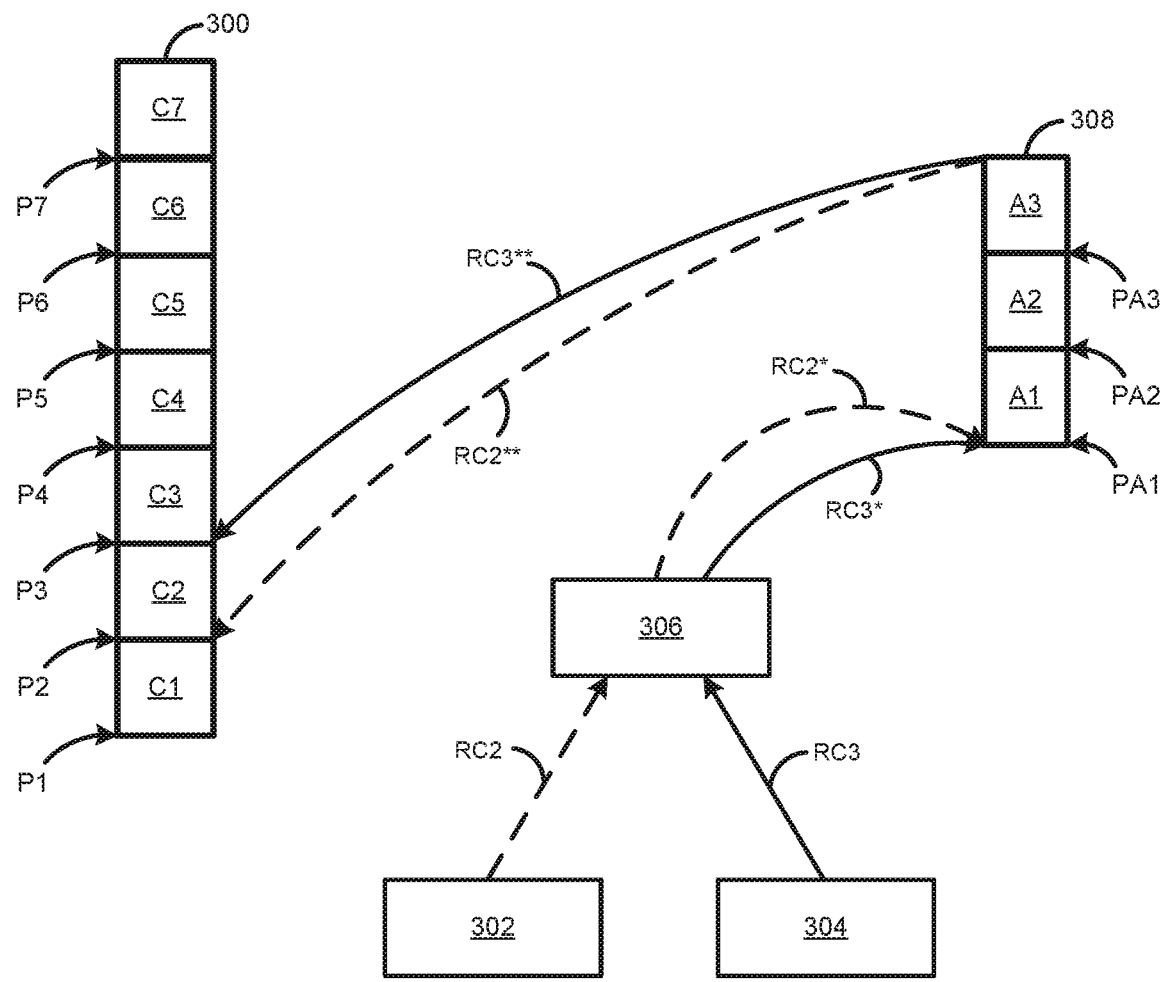
FIG. 3A is a diagram of redirecting a content player to an initial segment of an advertisement associated with a content stream.
Figure 3B:
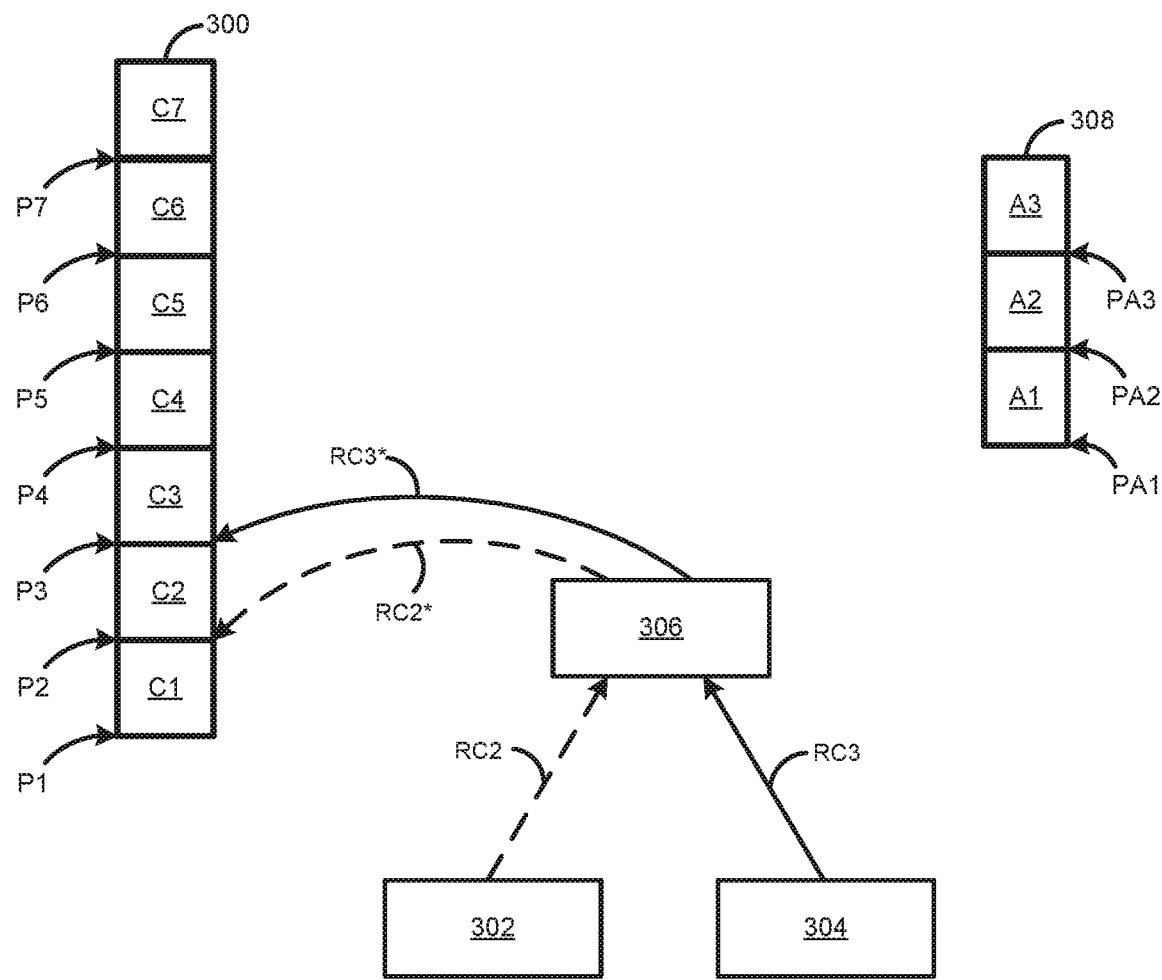
FIG. 3B is a diagram of directing a content player to a point in a content stream based on a subsequent request for the content stream.

FIG. 3A and FIG. 3B are block representations of a process for redirecting/directing content players to a segment(s) of an advertisement associated with a content stream. Turning first to FIG. 3A, FIG. 3A is a block representation of a process for redirecting content players to an initial segment of an advertisement associated with a content stream. The content stream 300 may be provided by a content source (e.g., content source(s) 127) and/or otherwise made available to content player 302 (e.g., a Roku, media device 120, mobile device 124) and/or content player 304 (e.g., an Android TV, media device 120, mobile device 124) as, or in a form comprising, a playlist, a multimedia file, a text file, a code, a script, metadata, a resource location(s), combinations thereof, and the like. Additionally, providing and/or making available the content stream 300 may comprise associating the content stream 300 with resource locations.

A content stream (e.g., the content stream 300, a video stream) may comprise segments. The segments are fragments of the content stream. The segments may be collections of information. For example, a segment of video content (e.g., a video segment) may be a collection of video frames. The segment may correspond to a single file that is listed in a playlist containing resource locations (e.g., URLs) of different files that comprise the content stream (e.g., the video stream). Combined together, the segments may make up the content stream. For example, segments of video may make up a whole video.

The content stream 300 may be associated with an advertisement 308 (e.g., a pre-roll ad, a promotional video that plays before content (e.g., content stream 300), etc.). The content stream 300 may be associated with the advertisement 308 based on a variety of factors such as on genre, type, rating, relevance, rank, user information (e.g., user preferences, user viewing history, user recommendations, user demographics, etc.) combinations thereof, and the like. For example, the content stream 300 (a segment of the content stream 300, a point of the content stream 300) may relate to football. The advertisement 308 (a segment of the advertisement 308, a point of the advertisement 308) may relate to football and/or sports. The content stream 300 (the segment of the content stream 300, the point of the content stream 300) may be associated with the advertisement 308 (the segment of the advertisement 308, the point of the advertisement 308) based on their relationships to football and/or sports.

Consumption on the content stream 300 (the segment of the content stream 300, the point of the content stream 300) by a content player (e.g., the content player 302, the content player 304) may cause the associated advertisement 308 (the segment of the advertisement 308, the point of the advertisement 308) to be provided to and/or otherwise made available to the content player (e.g., the content player 302, the content player 304). For example, if a user of the content player (e.g., the content player 302, the content player 304) watches football (e.g., the content stream 300, a video of football, etc.) via the content player, then the user may be provided an advertisement (e.g., the advertisement 308, a video advertisement, a pre-roll ad, etc.) related to football/sports to watch via the content player.

The consumption of the content (e.g., the content stream 300) and/or the associated advertisement (e.g., the advertisement 308) may be tracked and/or monitored. For example, the consumption of the content stream 300 and/or the associated advertisement 308 may be tracked and/or monitored by the redirect device 306 (e.g., ad tracking, ad impression, etc.).

The content stream 300 may comprise segments (e.g., C1, C2, C3, C4, C5, C6, segments of video of a football game or show, segments of an advertisement, etc.). A segment is a fragment of a content stream (e.g., a video stream, content stream 300). Segments may be collections of information. For example, a segment of video content (e.g., a video segment) may be collection of video frames. A segment may correspond to a single file that is listed in a playlist containing resource locations (e.g., URLs) of different files that comprise content (e.g., video). Combined together, segments make up the content stream. For example, segments of video may make up a whole video. Also, one or more segments may precede segments C1, C2, C3, C4, C5, C6, C7 and one or more segments may follow the segments C1, C2, C3, C4, C5, C6, C7.

The segments C1, C2, C3, C4, C5, C6, C7 may be associated with different points (P1, P2, P3, P4, P5, P6, P7) of the content stream 300. Points P1, P2, P3, P4, P5, P6, and P7 may be associated with a runtime/duration of the content stream 300. For example, the point P1 may correspond with the segment C1 at the start of the content stream 300, the point P2 may correspond with the segment C2 at a 1-second runtime/duration of the content stream 300, the point P3 may correspond with the segment C3 at a 2-second run-time/duration of the content stream 300, the point P4 may correspond with the segment C4 at a 3-second runtime/duration of the content stream 300, the point P5 may correspond with the segment C5 at a 4-second runtime/duration of the content stream 300, the point P6 may correspond with the segment C6 at a 5-second runtime/duration of the content stream 300, and the point P7 may correspond with the segment C7 at a 6-second runtime/duration of the content stream 300. Additionally, the segments (C1, C2, C3, C4, C5, C6) and/or the different points (P1, P2, P3, P4, P5, P6, P7) may be associated with resource locations.

The advertisement 308 may comprise segments (e.g., A1, A2, A3, segments of video of an advertisement/pre-roll ad, etc.). One or more segments may precede segments A1, A2, A3 and one or more segments may follow the segments A1, A2, A3. The segments A1, A2, A3 may be associated with different points (PA1, PA2, PA3) of the advertisement 308. Points PA1, PA2, PA3 may be associated with a runtime/duration of the advertisement 308. For example, the point PA1 may correspond with the segment A1 at the start of the advertisement 308, the point PA2 may correspond with the segment A2 at a 1-second runtime/duration of the advertisement 308, and the point PA3 may correspond with the segment A3 at a 2-second run-time/duration of the advertisement 308. Additionally, the segments (A1, A2, A3) and/or the different points (PA1, PA2, PA3) may be associated with resource locations.

A redirect device 306 (e.g., the redirect device 132) may receive requests (e.g., RC2, RC3) for the content stream 300 from the content player 302 and the content player 304. The requests (e.g., RC2, RC3) for the content stream 300 may comprise requests to initiate receipt of the content stream 200 starting at specific points (e.g., P2, P3, etc.) in the content stream 300. The request RC2 is a request to initiate (e.g., begin playback, start streaming, request, etc. . . . ) the content stream 300 at point P2 which corresponds to segment C2 and the request RC3 is a request to initiate the content stream 300 at point P3 which corresponds to segment C3.

The content player 302 may send the request RC2 to the redirect device 306 requesting the content stream 300 at the point P2. The content player 302 may send the request RC3 to the redirect device 306 requesting the content stream 300 at the point P3. The redirect device 306 may determine that the request RC2 and the request RC3 are initial requests for the content stream 300 and/or the associated advertisement 308. The redirect device 306 may determine that the request RA2 is the initial request for the content stream 300 and/or the associated advertisement 308 because a session ID is not associated with the request RC2, or the content player 302. The redirect device 306 may determine that the request RC3 is the initial request for the content stream 300 and/or the associated advertisement 308 because a session ID is not associated with the request RC3, or the content player 304.

The redirect device 306, based on the determination that the request RC2 is the initial request for the content stream 300, the redirect device 306 may redirect the request RC2 as a request RC2* to the point PA1 which corresponds to an initial segment A1 of the advertisement 308 despite the fact that the content player 302 requested point P2 in of the content stream 300. The content player 302 may consume the advertisement 308 starting at the segment A1 at the point PA1. After the content player 302 consumes (e.g., displays the advertisement as a pre-roll ad, etc.) at least the initial segment A1 of the advertisement 308, the redirect device 306 may direct the request RC2* as a request RC2** to the point P2 which corresponds to the segment C2 of the content stream 300 as requested by the content player 302.

The redirect device 306, based on the determination that the request RC3 is the initial request for the content stream 300, the redirect device 306 may redirect the request RC3 as a request RC3* to the point PA1 which corresponds to an initial segment A1 of the advertisement 308 despite the fact that the content player 304 requested of the point P3 of the content stream 300 which corresponds to the segment C3. The content player 304 may consume the advertisement 308 starting at the segment A1 at the point PA1. After the content player 304 consumes (e.g., displays the advertisement as a pre-roll ad, etc.) at least the initial segment A1 of the advertisement 308, the redirect device 306 may direct the request RC3* as a request RC3** to the point P3 which corresponds to the segment C3 of the content stream 300 as requested by the content player 304.

Turning now to FIG. 3B, FIG. 3B is a block representation of a process for directing content players to segments of a content stream based on requests. The redirect device 306 may receive requests (e.g., RC2, RC3) for the content stream 300 from the content player 302 and the content player 304. The requests (e.g., RC2, RC3) for the content stream 300 may comprise requests for to initiate receipt of the content stream 300 starting at specific points (e.g., P2, P3, etc.) in the content stream 300. The content player 302 may send a request RC2 to the redirect device 306 requesting the content stream 300 starting at the point P2 which corresponds to the segment C2. The content player 304 may send a request RC3 to the redirect device 306 requesting the content stream 300 starting at the point P3 which corresponds to the segment C3.

The requests RC2 and RC3 may comprise session IDs. The requests RC2 and RC3 may be sent as HTTP queries (e.g., HTTP GET) that comprise session IDs as parameters. Session IDs may be associated with the content players. A session ID may be associated with content player 302 based on a device identifier (e.g., device identifier 136) associated with the content player 302. A session ID may be associated with content player 304 based on a device identifier (e.g., device identifier 136) associated with the content player 304.

The redirect device 306 may determine that the request RC2 and the request RC3 are not initial requests for the content stream 300 and/or the associated advertisement 308. The redirect device 306 may determine that the request RA2 is not the initial request for the content stream 300 and/or the associated advertisement 308 because a session ID is associated with the request RC2, or the content player 302. The redirect device 306 may determine that the request RC3 is not the initial request for the content stream 300 and/or the associated advertisement 308 because a session ID is associated with the request RC3, or the content player 304.

The redirect device 306 may determine that session IDs are associated with the requests RC2 and RC3 in different ways. For example, the redirect device 306 may determine that session IDs are associated with the requests RC2 and RC3 by determining that the requests RC2 and RC3 comprise session IDs. Further, the redirect device 306 may determine that session IDs are associated with the requests RC2 and RC3 by determining that session IDs are stored in a storage (e.g., database 138, mass storage device 904 (FIG. 9), etc.). For example, the redirect device 306 may access a lookup table comprising session ID information to determine that session IDs are associated with the requests RC2 and RC3. Additionally, the redirect device 306 may determine that session IDs are associated with the requests RC2 and RC3 by any other suitable means, form, and/or logic.

The redirect device 306, based on the determination that the request RC2 is not the initial request for the content stream 300 and/or the associated advertisement 308, may direct/associate the request RC2 as a request RC2* to the to the point P2 which corresponds to the segment C2 of the content stream 300 as requested by the content player 302.

The redirect device 306, based on the determination that the request RC3 is not the initial request for the content stream 300 and/or the associated advertisement 308, may direct/associate the request RC3 as a request RC3* to the point P3 which corresponds to the segment C3 of the content stream 300 as requested by the content player 302.

Figure 4:
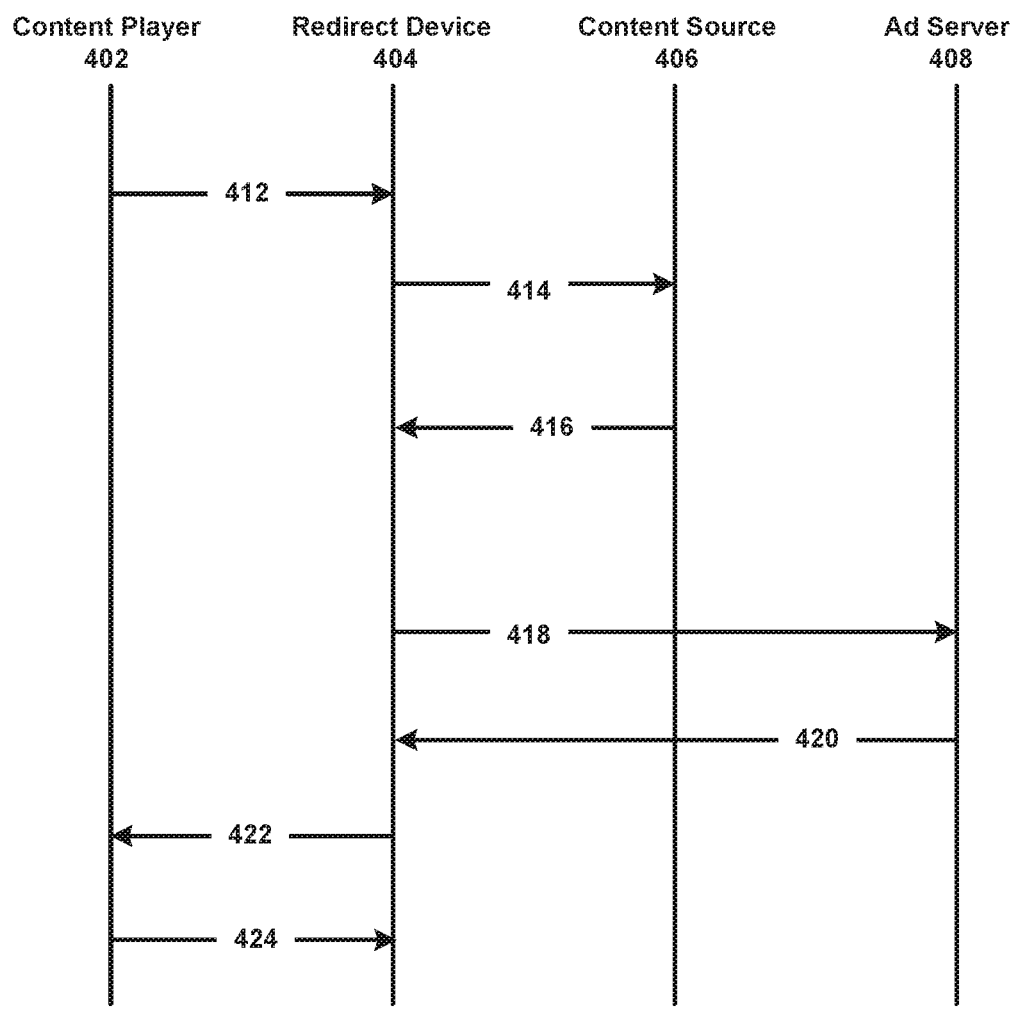
FIG. 4 is a messaging diagram according to the methods described.

FIG. 4 is a messaging diagram of redirection of a request for content (e.g., video) to an initial segment of an advertisement. The method may comprise communication over a network between a plurality of devices, such as a content player 402, a redirect device 404, content source 406, and/or ad server 408.

At 412, a request for content is transmitted from a content player 402 to a redirect device 404. The request for content may be based on hypertext transfer protocol (HTTP) data transmission. HTTP defines methods to indicate a desired action (e.g., content retrieval) to be performed on the identified resource (e.g., redirect device 404). An HTTP GET is a HTTP method for obtaining information from a particular resource. For example, the user device may employ HTTP GET (or any suitable method) to request a particular segment of content. Alternatively, the redirect device 404 may intercept a request for content sent to another device. The redirect device 404 may determine that the request for content is an initial request for the content. The redirect device 404 may determine that the request for the content is the initial request based on a session ID not being associated with the request and/or the content player 402.

Based on the request being the initial request for the content, at 414, the redirect device 404 may generate a session ID and request the content (e.g., resource locations associated with segments of the content) from a content source 406 (e.g., a content device, server, computing device, etc. . . . ). The content may be provided to the redirect device 404 via playlists, multimedia files, text files, code, script, metadata, resource locations, combinations thereof, and the like.

At 416, the content source 406 sends the content to the redirect device 404. At 418, the redirect device 404 also requests an advertisement (e.g., pre-roll ad, advertisement file, advertisement playlist, metadata, resource locations, etc.) from the ad server 408 to be associated with the content. The advertisement may comprise one or more segments. An initial segment of the advertisement may be associated with a requested segment of the content.

At 420, the ad server 408 sends the advertisement (e.g., advertisement, advertisement file, advertisement playlist, code, script, metadata, resource location(s), etc.) comprising one or more segments to the redirect device 404. An initial segment of the advertisement may be associated with the requested segment of the content. The redirect device 404 may be configured to provide the advertisement to the content player 402 by providing one or more resource locations corresponding to segments of the content and to one or more segments of the advertisement. As such, the redirect device 404 may combine (e.g., associate) the content with the advertisement such that the content player 402 may consume the combined content/advertisement. The combined content/advertisement may be one or more resource locations of the content and the advertisement comprised in a playlist. At 422, the combined content/advertisement are sent from the redirect device 304 to the content player 402 for consumption (e.g., video played, advertisement played, video/advertisement file executed, video/advertisement resource locations accessed, etc.). The content player 402 may consume (display, render, etc. . . . ) the combined content/advertisement, with an initial segment of the advertisement being consumed (displayed, rendered, etc. . . . ) by the content player 402 prior to the requested content being consumed (displayed, rendered, etc. . . . ).

When the combined content/advertisement is consumed by the content player 402, the consumption may be tracked as one or more advertisement impressions. For example, information associated with the consumption may be stored by a device such as the redirect device 404, the ad server 408, and the like. Additionally, other devices may be used to track consumption of the combined content/advertisement.

At 424, information used for tracking consumption of the combined content may be sent from the content player 402 to the redirect device 404. Information used for tracking consumption of the combined content may also be sent to any other device in the network (e.g., ad server 406, content source 406). For example, consumption of the combined content may cause the redirect device 404 to send a notification (e.g., an impression, a beacon, etc.) to the ad server 408.

Figure 5:
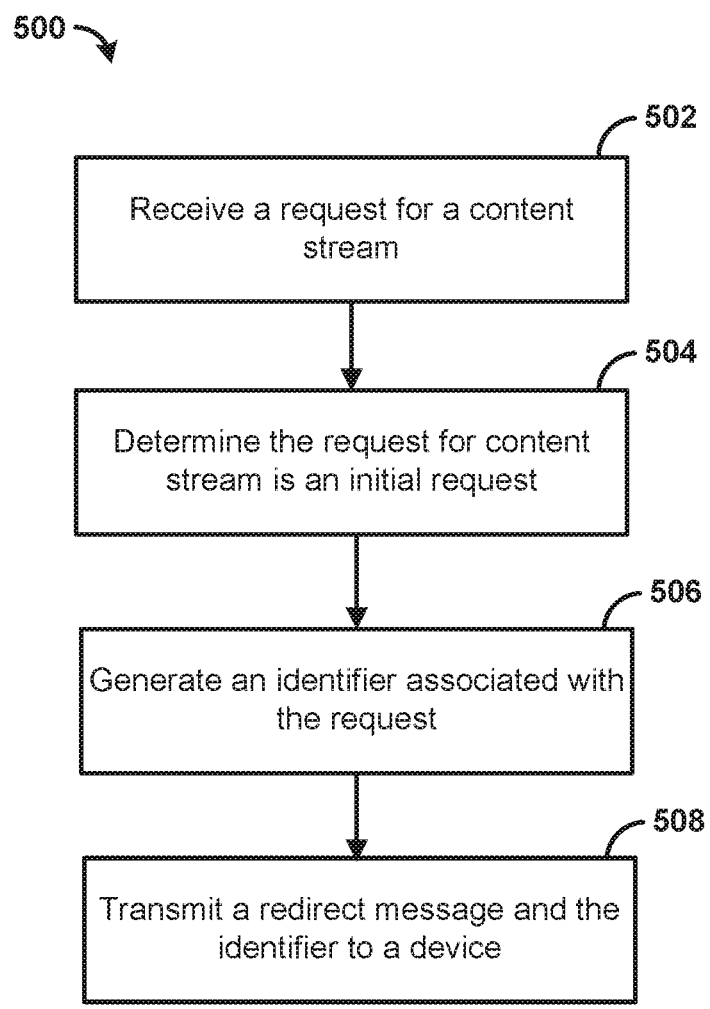
FIG. 5 is a flowchart of an example method for redirecting a content player to an initial segment of an advertisement.

FIG. 5 is a diagram of an example process for redirecting content players (e.g., video players) to an initial segment of an advertisement. At step 502, a network device (e.g., redirect device 132) may receive a request (e.g., HTTP GET) for content (e.g., a content stream, streaming content, etc. . . . ) from a content player (e.g., user device, computing device, network device, media device 120, mobile device 124). The content may be pre-recorded video, live video, combinations thereof and the like. The content may comprise one or more segments (e.g., video segments). The content may be associated with one or more advertisements. The one or more advertisements may comprise one or more segments (e.g., video segments). The request for the content may comprise a request for a particular segment of the content. For example, the request for content may comprise a request for the content starting at a specific time in the content, wherein the specific time corresponds to a particular segment. The one or more segments of the content may be accessible via a resource location and/or resource identifier, such as a uniform resource locator (URL) addresses, for example.

At step 504, the network device (e.g., redirect device 132) may determine that the request for content is an initial request for the content. Determining that the request for the content is the initial request for the content may comprise determining that a session identifier (ID) is associated with the request and/or the content player. The request for the content may be determined to be an initial request for the content if a session ID does not exist or is not already associated with the request and/or the content player. An associated session ID may be stored by the network device so that subsequent request for the content may be identified as not being an initial request for the content. The session ID may be stored as a cookie, form field, Uniform Resource Locator, combinations thereof and the like.

At step 506, based on determining that the request for the content is the initial request, the network device may generate an identifier associated with the request and/or the user device. The identifier may be a session ID. The session ID may be stored by the network device so that a subsequent request for the content may be identified as not being the initial request for the content. The session ID may be stored as a cookie, form field, Uniform Resource Locator, token, combinations thereof, and the like.

At step 508, the network device can transmit a redirect message and the identifier to the content player (e.g., the device from which the request for the content originated). The network device can transmit the redirect message and the identifier to the content player based on determining that the request for the content is the initial request. The network device can transmit the redirect message and the identifier to the content player regardless of which segment of the content was actually requested by the content player. As such, the content player can be provided an initial segment of an advertisement (e.g., the initial segment of the advertisement can be delivered to, or retrieved by, the content player). As such, an advertisement (e.g., pre-roll ad) may be consumed by the content player prior to receiving the content segment requested.

After the advertisement and/or at least the initial segment of the advertisement is consumed by the content player, the network device may provide the requested content segment (e.g., a second segment) to the content player or otherwise cause the requested content segment to be delivered to, or retrieved by, the content player. The content may be packaged with the advertisement such that the content player receives the content contemporaneous to receiving the advertisement, such that an initial segment of the advertisement may be required to be initiated and/or consumed by the content player prior to the requested content segment being consumed by the content player. Additionally, the requested content (e.g., requested content segment) and the advertisement (e.g. advertisement segment) may be provided to and/or otherwise made available to the content player as or in a form comprising, playlists, multimedia files, text files, code, script, metadata, resource locations, combinations thereof, and the like.

Figure 6:
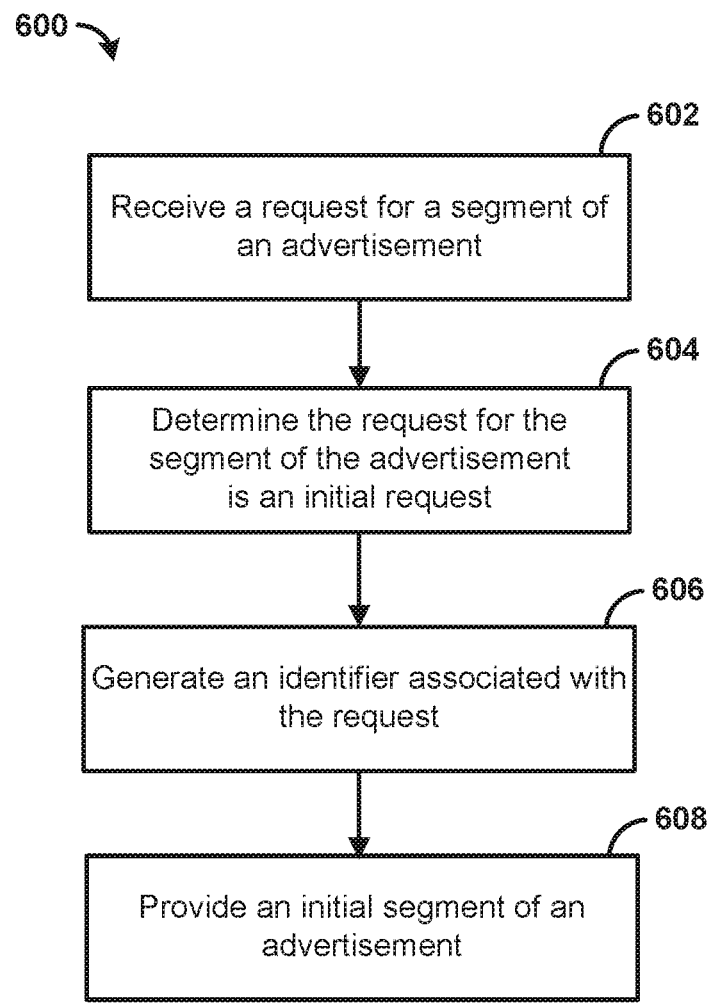
FIG. 6 is a flowchart of another example method for redirecting a content player to an initial segment of an advertisement.

FIG. 6 is a diagram of an example process for redirecting content players (e.g., video players) to an initial segment of an advertisement. At step 602, a network device (e.g., redirect device 132) may receive a request (e.g., HTTP GET) for a segment of an advertisement from a content player (e.g., user device, computing device, network device, media device 120, mobile device 124). The advertisement may comprise one or more segments (e.g., pre-roll ad segments, video segments, etc.). For example, the request for the segment of the advertisement may comprise a request for the advertisement starting at a specific time in the advertisement, wherein the specific time corresponds to a particular segment. The one or more segments of the advertisement may be accessible via a resource location and/or resource identifier, such as a uniform resource locator (URL) addresses, for example. The advertisement may be pre-recorded video, live video, combinations thereof and the like. The advertisement may be associated with content consumed by the content player such that the advertisement and the content are of a same or similar genre. The advertisement may be comprised with the content. Alternatively, the advertisement may not be comprised with the content.

At step 604, the network device (e.g., redirect device 132) may determine that the request for the segment of the advertisement is an initial request for the segment of the advertisement. Determining that the request for the segment of the advertisement is the initial request may comprise determining that a session identifier (ID) is associated with the request and/or the content player. The request for the segment of the advertisement may be determined to be an initial request for the segment of the advertisement if a session ID does not exist or is not already associated with the request and/or the content player. An associated session ID may be stored by the network device so that subsequent request for the segment of an advertisement and/or advertisement may be identified as not being an initial request. The session ID may be stored as a cookie, form field, Uniform Resource Locator, combinations thereof and the like.

At step 606, based on determining that the request for the segment of the advertisement is the initial request, the network device may generate an identifier associated with the request and/or the user device. The identifier may be a session ID. The session ID may be stored by the network device so that a subsequent request for the segment of the advertisement and/or the advertisement may be identified as not being the initial request for the segment of an advertisement and/or the advertisement. The session ID may be stored as a cookie, form field, Uniform Resource Locator, token, combinations thereof, and the like.

At step 608, based on determining that the request for the segment of the advertisement is the initial request and regardless of which segment of the advertisement was actually requested, the network device may provide an initial segment of the advertisement to the content player or otherwise cause the initial segment of the advertisement to be delivered to, or retrieved by, the content player. The initial segment of the advertisement may be provided to the content player regardless of which segment of the advertisement was requested by the content player. As such, an advertisement (e.g., pre-roll ad) may be consumed by the content player starting at the initial segment of the advertisement (e.g., video played as a pre-roll ad). Additionally, the requested advertisement (e.g., requested advertisement segment) may be provided to and/or otherwise made available to the content player as or in a form comprising, playlists, multimedia files, text files, code, script, metadata, resource locations, combinations thereof, and the like.

Figure 7:
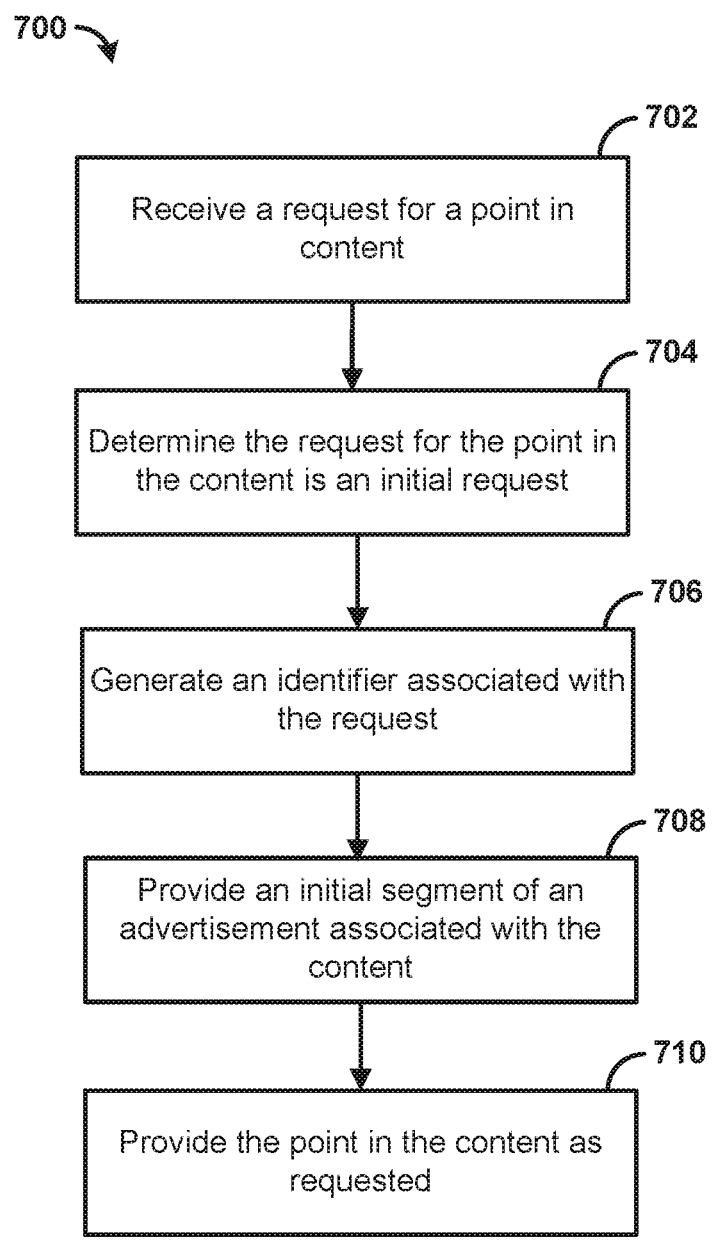
FIG. 7 is a flowchart of an example method for redirecting a content player to an initial segment of an advertisement.

FIG. 7 is a diagram of an example process for redirecting content players (e.g., video players) to an initial segment of an advertisement associated with content. At step 702, a network device (e.g., redirect device 132) may receive a request (e.g., HTTP GET) for a point in content from a content player (e.g., user device, computing device, network device, media device 120, mobile device 124). The content may be and/or comprise pre-recorded video, live video, combinations thereof and the like. The content may comprise one or more segments (e.g., segments of video of a football game or show, etc.) associated with one or more points. The one or more points may be associated with a runtime/duration of the content (e.g., point 1 associated with a 2-second runtime/duration of the content, point 2 associated with a 3-second runtime/duration of the content, etc.). The content and/or one or more points in the content may be associated with one or more advertisements. The one or more advertisements may comprise one or more segments (e.g., video segments) associated with one or more points. The one or more points may be associated with a runtime/duration of the advertisement (e.g., point 1 associated with a 2-second runtime/duration of the advertisement, point 2 associated with a 3-second runtime/duration of the advertisement, etc.). The content may be associated with the advertisement based on a variety of factors such as on genre, type, rating, relevance, rank, combinations thereof, and the like. For example, content or a segment/point of the content relating to football may be associated with an advertisement and/or a segment/point of the advertisement relating to sports.

The content, the one or more segments of the content, and/or the one or more points in the content may be accessible via a resource location and/or resource identifier, such as a uniform resource locator (URL) addresses, for example. The advertisement, the one or more segments of the advertisement, and/or the one or more points in the advertisement may be accessible via a resource location and/or resource identifier, such as a uniform resource locator (URL) addresses, for example.

At step 704, the network device (e.g., redirect device 132) may determine that the request for the point in the content is an initial request for the point in the content. Determining that the request for the point in the content is the initial request for the point in the content may comprise determining that a session identifier (ID) is associated with the request and/or the content player. The request for the point in the content may be determined to be an initial request for the point in the content if a session ID does not exist or is not already associated with the request and/or the content player. An associated session ID may be stored by the network device so that subsequent request for the point in the content and/or the content may be identified as not being an initial request. The session ID may be stored as a cookie, form field, Uniform Resource Locator, combinations thereof and the like.

At step 706, based on determining that the request for the point in the content is the initial request, the network device may generate an identifier associated with the request and/or the user device. The identifier may be a session ID. The session ID may be stored by the network device so that a subsequent request for the point in the content and/or the content may be identified as not being the initial request for the point in the content and/or the content. The session ID may be stored as a cookie, form field, Uniform Resource Locator, token, combinations thereof, and the like.

At step 708, based on determining that the request for the point in the content is the initial request and regardless of which point in the content was actually requested, the network device may provide an initial segment of an advertisement associated with the content to the content player or otherwise cause the initial segment of the advertisement associated with the content to be delivered to, or retrieved by, the content player. The advertisement may be associated with the requested point in the content based on metadata comprised in the content and/or the advertisement. For example, metadata comprised in the content containing a genre of content (genre of a point/segment of the content) requested may be compared to metadata containing a genre of an advertisement (genre of a point/segment of the advertisement). If the genres are the same, the advertisement may be associated with the content. The initial segment of the associated advertisement may be provided to the content player regardless of which point in the content was requested by the content player. As such, an advertisement (e.g., pre-roll ad) may be consumed by the content player prior to receiving the point in the content requested.

At step 710, after the advertisement and/or at least the initial segment of the advertisement is consumed by the content player, the network device may provide the requested point in the content (e.g., point 2 associated with a 3-second runtime/duration of the content, etc.) to the content player or otherwise cause the requested point in the content to be delivered to, or retrieved by, the content player. The point in the content, the segments of the content, and/or the content may be packaged with the points of the advertisement, the segments of the advertisement, and/or the advertisement such that the content player receives the content contemporaneous to receiving the advertisement, such that the initial segment of the advertisement may be required to be initiated (e.g., begin playback, start streaming, requested, etc. . . . ) and/or consumed by the content player prior to the requested point in the content being consumed by the content player. Additionally, the requested point in the content and the associated advertisement (e.g. initial segment of the advertisement) may be provided to and/or otherwise made available to the content player as or in a form comprising, playlists, multimedia files, text files, code, script, metadata, resource locations, combinations thereof, and the like.

Figure 8:
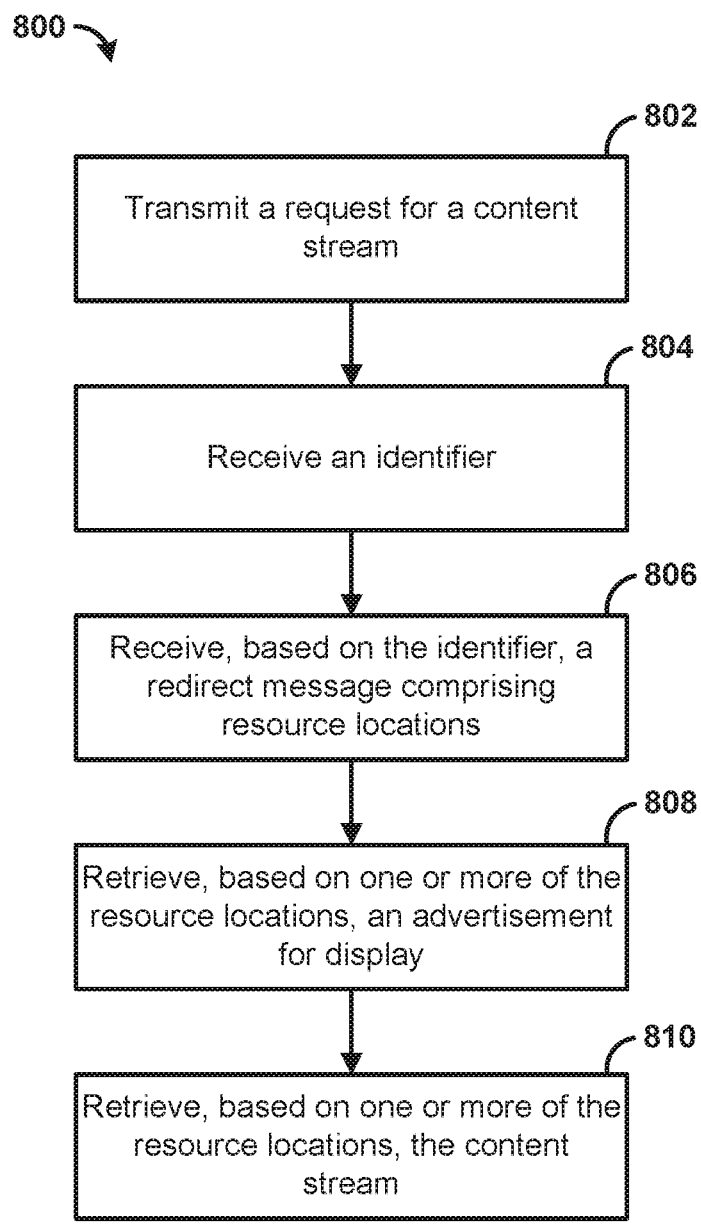
FIG. 8 is a flowchart of another example method for redirecting a content player to an initial segment of an advertisement.

FIG. 8 is a diagram of example process for redirecting user devices (e.g., content players) to an initial segment of an advertisement, regardless of which segment is requested. At step 802, a user device (e.g., media device 120, mobile device 124, computing device, etc.) may transmit a request (e.g., HTTP GET) for content. The content may be pre-recorded video, live video, combinations thereof, and the like. The content may be associated with an advertisement (e.g., pre-roll ad, pre-roll video) that plays before particular segments of the content plays and/or is otherwise consumed. The content may comprise one or more segments (e.g., video segments). The content may be associated with one or more advertisements. The one or more advertisements may comprise one or more segments (e.g., video segments). The one or more segments of content may comprise one or more segments of an advertisement. The request may comprise a request for a particular segment of the content. For example, the request may comprise a request for a segment of the content that relates to a specific point in time in the content. The particular segment of the one or more segments of the content may be accessible via a playlist comprising resource location(s) and/or resource identifier information such as a uniform resource locator (URL) addresses, for example.

At step 804, the network device may receive an identifier. For example, the network device may receive the identifier in response to transmitting the request. The identifier may be a session ID and may provide an indication that the request is an initial request for the content. The identifier may provide an indication that a subsequent request for the content is not an initial request for the content. A determination that the request for content is the initial request for the content may be made by determining that a session identifier (ID) does not exist or is not included with a request. Additionally, the session ID may be stored by the user device or another device so that subsequent requests for content may be identified as not being the initial request for the content. The session ID may be stored as a cookie, form field, Uniform Resource Locator, and/or the like.

At step 806, based on the identifier providing the indication that the request is the initial request for the content, the user device may receive a redirect message comprising a resource location for an initial segment of an advertisement. The redirect message may be a HTTP response. For example, the redirect message may be a HTTP 302 response with a URL associated with a resource (e.g., content) in the location header field. If the identifier provides an indication that the request is not the initial request for the content, the user device may receive a message comprising a resource location(s) for the content as requested. Request for the content may be tracked and/or monitored by one or more devices (e.g., the redirect device 132, the ad server 126, the content source(s) 127).

At step 808, the user device can retrieve the initial segment of the advertisement. The user device can retrieve the initial segment of the advertisement based on the resource location for the initial segment of the advertisement. The user device can retrieve the initial segment of the advertisement and/or the advertisement for display. The user device can access the resource location for the initial segment of the advertisement. Accessing the resource location may cause the initial segment (and remaining segments) of the advertisement (e.g., pre-roll ad) to be delivered, retrieved, or otherwise accessed. Accessing the resource location for the initial segment of the advertisement may be tracked/and or monitored (e.g., an ad impression) by one or more devices (e.g., the redirect device 132, the ad server 126, the content source(s) 127).

At step 810, the user device can retrieve the content item for display after the advertisement. The user device can retrieve the content item for display after the advertisement based on the one or more resource locations for the one or more segments of the content item. To retrieve the content item for display after the advertisement, the user device can receive a message comprising a resource location for the requested segment(s) of the content. The advertisement may be required to be initiated (e.g., begin playback, start streaming, requested, etc. . . . ) and/or consumed by the user device prior to initiating and/or consuming the content. The advertisement may be required to be initiated and/or consumed by the user device such that each of the segments of the advertisement, beginning at the initial segment of the advertisement, are consumed prior to consumption of the requested content. Additionally, the user device may receive and/or otherwise have access to the requested content as, or in a form comprising, playlists, multimedia files, text files, code, script, metadata, resource locations, and/or the like.

Figure 9:
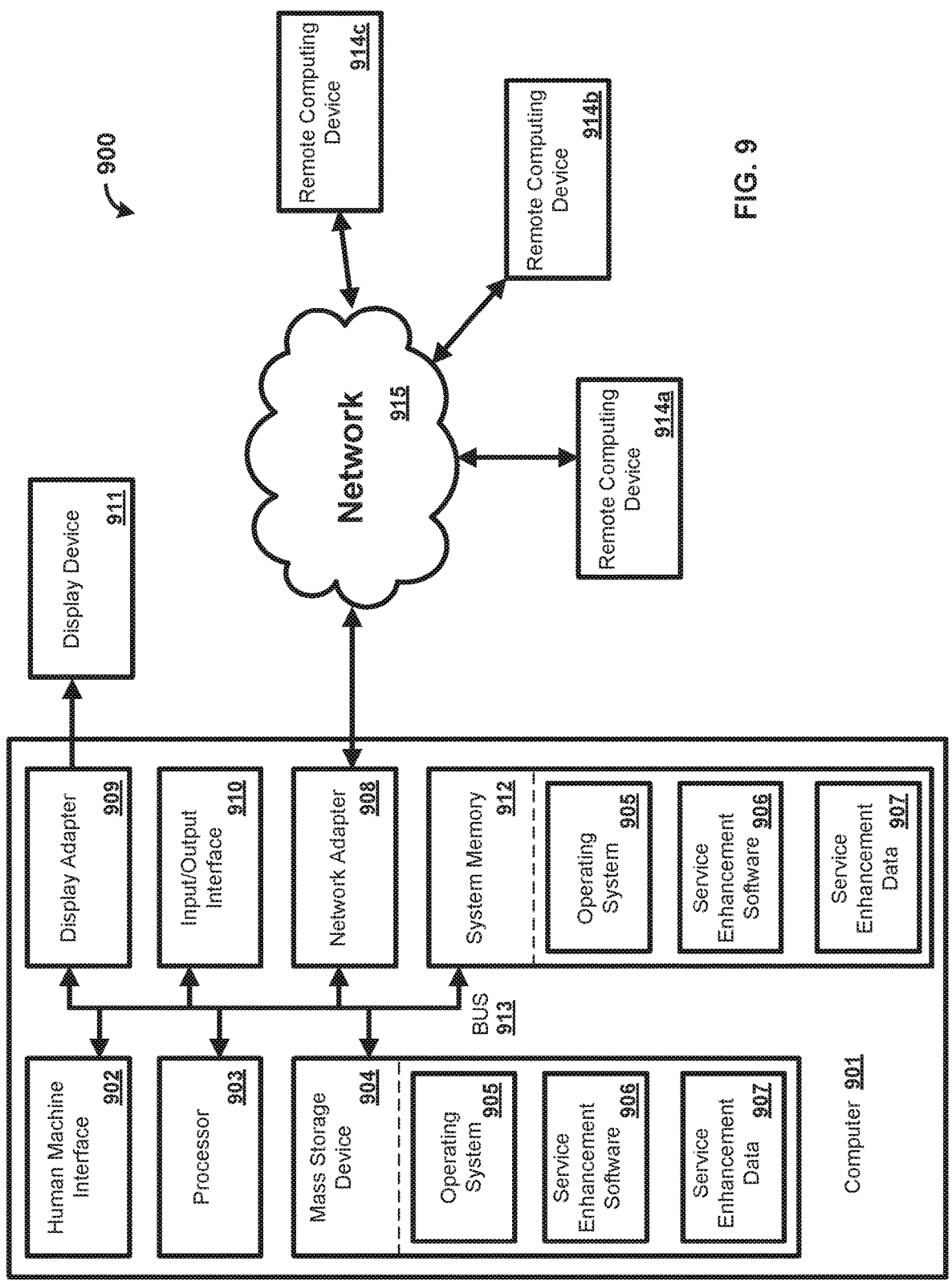
FIG. 9 is a block diagram of an example computing device in which the present methods and systems operate.

The methods and systems may be implemented on a computer 901 as in FIG. 9 and described below. By way of example, media device 120, mobile devices 124, ad server 126, content source(s) 127, and redirect device 132 of FIG. 1 may be computers as in FIG. 9. As a further example, any of the devices of FIG. 1, FIG. 2, and FIG. 3 may be computers as in FIG. 9. Similarly, one or more computers can be used to perform one or more functions in one or more locations. FIG. 9 is a block diagram of an example operating environment for performing the disclosed methods. This described operating environment is only an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems are operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

Further, one skilled in the art will appreciate that the systems and methods disclosed herein may be implemented via a general-purpose computing device in the form of a computer 901. The components of the computer 901 may comprise, but are not limited to, one or more processors 903, a system memory 912, and a system bus 913 that couples various system components including the one or more processors 903 to the system memory 912. The system may utilize parallel computing.

The system bus 913 represents one or more of several possible types of bus structures, including a memory bus or memory controller, a peripheral bus, an accelerated graphics port, or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 913, and all buses specified in this description may also be implemented over a wired or wireless network connection and each of the subsystems, including the one or more processors 903, a mass storage device 904, an operating system 905, service enhancement software 906, service enhancement data 907, a network adapter 908, the system memory 912, an Input/Output Interface 910, a display adapter 909, a display device 911, and a human machine interface 902, may be contained within one or more remote computing devices 914$a,b,c$ at physically separate locations, connected through buses of this form, in effect implementing a fully distributed system.

The computer 901 typically comprises a variety of computer readable media. Example readable media may be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the service enhancement data 907 and/or program modules such as the operating system 905 and the service enhancement software 906 that are immediately accessible to and/or are presently operated on by the one or more processors 903.

Additionally, the computer 901 may also comprise other removable/non-removable, volatile/non-volatile computer storage media. By way of example, FIG. 9 provides example of the mass storage device 904 which may provide non-volatile storage of computer code, computer readable instructions, data structures, program modules, and other data for the computer 901. For example and not meant to be limiting, the mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, the operating system 905 and the service enhancement software 906. Each of the operating system 905 and the service enhancement software 906 (or some combination thereof) may comprise elements of the programming and the service enhancement software 906. The service enhancement data 907 may also be stored on the mass storage device 904. The service enhancement data 907 may be stored in any of one or more databases known in the art. Examples of such databases comprise, DB2®, Microsoft® Access, Microsoft® SQL Server, Oracle@, mySQL, PostgreSQL, and the like. The databases may be centralized or distributed across multiple systems.

Further, the user may enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the one or more processors 903 via the human machine interface 902 that is coupled to the system bus 913, but may be connected by other interface and bus structures, such as a parallel port, game port, an IEEE 1394 Port (also known as a Firewire port), a serial port, or a universal serial bus (USB).

Additionally, the display device 911 may also be connected to the system bus 913 via an interface, such as the display adapter 909. It is contemplated that the computer 901 may have more than one display adapter 909 and the computer 901 may have more than one display device 911. For example, the display device 911 may be a monitor, an LCD (Liquid Crystal Display), or a projector. In addition to the display device 911, other output peripheral devices may comprise components such as speakers (not shown) and a printer (not shown) which may be connected to the computer 901 via the Input/Output Interface 910. Any step and/or result of the methods may be output in any form to an output device. Such output may be any form of visual representation, including, but not limited to, textual, graphical, animation, audio, tactile, and the like. The display device 911 and computer 901 may be part of one device, or separate devices.

The computer 901 may operate in a networked environment using logical connections to one or more remote computing devices 914a,b,c. By way of example, a remote computing device may be a personal computer, portable computer, smartphone, a server, a router, a network computer, a peer device or other common network node, and so on. Logical connections between the computer 901 and a remote computing device 914a,b,c may be made via a network 915, such as a local area network (LAN) and/or a general wide area network (WAN). Such network connections may be through the network adapter 908. The network adapter 908 may be implemented in both wired and wireless environments. Such networking environments are conventional and commonplace in dwellings, offices, enterprise-wide computer networks, intranets, and the Internet.

For purposes of example, application programs and other executable program components such as the operating system 905 are shown herein as discrete blocks, although it is recognized that such programs and components reside at various times in different storage components of the computer 901, and are executed by the one or more processors 903 of the computer. An implementation of the service enhancement software 906 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The methods and systems may employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g., genetic algorithms), swarm intelligence (e.g., ant algorithms), and hybrid intelligent systems (e.g., Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be example rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as example only, with a true scope and spirit being indicated by the following claims.

What is claimed is:

1. A method comprising:
   receiving, from a device, a request for a content stream, wherein the content stream comprises one or more segments of a content item and one or more advertisements, and wherein the request causes the content stream to initiate output of the content stream at a segment of an advertisement of the one or more advertisements; and
   causing, before output of the segment of the advertisement, based on a determination that the request is an initial request and based on a determination that the segment of the advertisement occurs after an initial segment of the advertisement, the device to initiate the content stream at the initial segment of the advertisement, wherein the content stream resumes output of the segment of the advertisement after output of the initial segment of the advertisement, and wherein the content stream resumes output of the one or more segments of the content item after output of the segment of the advertisement.

2. The method of claim 1, further comprising receiving a redirect message, wherein the redirect message comprises an identifier and one or more uniform resource locator (URL) addresses, wherein the identifier is associated with the request.

3. The method of claim 1, further comprising determining, based on a determination that a session identifier for the request does not exist, that the request is an initial request.

4. The method of claim 3, further comprising associating the session identifier with the request for the content stream.

5. The method of claim 1, wherein the output of the initial segment of the advertisement is tracked.

6. The method of claim 1, wherein the content item and the advertisement are associated by a genre.

7. The method of claim 1, further comprising:
receiving, by the device, a redirect message, wherein the redirect message comprises a resource location for the initial segment of the advertisement, a resource location for the segment of the advertisement, and one or more resource locations for the one or more segments of the content item;
retrieving, based on the resource location for the initial segment of the advertisement, the initial segment of the advertisement for output;
retrieving, based on the resource location for the segment of the advertisement, the segment of the advertisement for output after the initial segment of the advertisement; and
retrieving, based on the one or more resource locations for the one or more segments of the content item, the one or more segments of the content item for output after the segment of the advertisement.

8. A method comprising:
sending a request for a content stream, wherein the content stream comprises one or more segments of a content item and one or more advertisements, and wherein the request causes the content stream to initiate output of the content stream at a segment of an advertisement of the one or more advertisements;
causing, before output of the segment of the advertisement, based on a determination that the request is an initial request and based on a determination that the segment of the advertisement occurs after an initial segment of the advertisement, the content stream to initiate at the initial segment of the advertisement;
retrieving, based on a resource location for the initial segment of the advertisement, the initial segment of the advertisement for output;
retrieving, based on a resource location for the segment of the advertisement, the segment of the advertisement for output after the initial segment of the advertisement; and
retrieving, based on one or more resource locations for the one or more segments of the content item, the one or more segments of the content item for output after the segment of the advertisement.

9. The method of claim 8, wherein the content stream comprises video.

10. The method of claim 8, wherein the resource location for the initial segment of the advertisement and the resource location for the segment of the advertisement comprise a uniform resource locator (URL) address, and wherein the one or more resource locations for the one or more segments of the content item comprise one or more URL addresses.

11. The method of claim 8, further comprising receiving, based on a determination that an identifier associated with the request for the content stream does not exist, the identifier that indicates that the request for the content stream is an initial request.

12. The method of claim 8, further comprising receiving a redirect message, wherein the redirect message comprises information for tracking consumption of the initial segment, the one or more segments of the content item, or both.

13. The method of claim 8, wherein the content item and the advertisement are associated by a genre.

14. An apparatus comprising:
one or more processors; and
memory storing processor executable instructions that, when executed by the one or more processors, cause the apparatus to:
receive, from a device, a request for a content stream, wherein the content stream comprises one or more segments of a content item and one or more advertisements, and wherein the causes the content stream to initiate output of the content stream at a segment of an advertisement of the one or more advertisements; and
cause, before output of the segment of the advertisement, based on a determination that the request is an initial request and based on a determination that the segment of the advertisement occurs after an initial segment of the advertisement, the device, to initiate the content stream at the initial segment of the advertisement, wherein the content stream resumes output of the segment of the advertisement after output of the initial segment of the advertisement, and wherein the content stream resumes output of the one or more segments of the content item after output of the segment of the advertisement.

15. The apparatus of claim 14, wherein the content stream further comprises video.

16. The apparatus of claim 14, wherein the processor executable instructions, when executed by the one or more processors, further cause the apparatus to receive a redirect message, wherein the redirect message comprises an identifier and one or more uniform resource locator (URL) addresses, wherein the identifier is associated with the request.

17. The apparatus of claim 14, wherein the processor executable instructions, when executed by the one or more processors, further cause the apparatus to determine, based on a determination that a session identifier for the request does not exist, that the request is an initial request.

18. The apparatus of claim 17, wherein the processor executable instructions, when executed by the one or more processors, further cause the apparatus to associated the session identifier with the request for the content stream.

19. The apparatus of claim 14, wherein the output of the initial segment of the advertisement is tracked.

20. The apparatus of claim 14, wherein the content item and the advertisement are associated by a genre.

* * * * *